(12) United States Patent
Bartoli et al.

(10) Patent No.: US 9,884,446 B2
(45) Date of Patent: Feb. 6, 2018

(54) FORMING APPARATUS, HEATING STATION AND METHOD FOR HEATING SET PORTIONS

(71) Applicant: Sarong Societa' per Azioni, Reggiolo (IT)

(72) Inventors: Andrea Bartoli, Reggio Emilia (IT); Flavio Traldi, San Prospero (IT)

(73) Assignee: Sarong Societa' per Azioni (IT)

( * ) Notice: Subject to any disclaimer, the term of this patent is extended or adjusted under 35 U.S.C. 154(b) by 0 days.

(21) Appl. No.: 15/183,121

(22) Filed: Jun. 15, 2016

(65) Prior Publication Data

US 2016/0361861 A1    Dec. 15, 2016

Related U.S. Application Data

(62) Division of application No. 13/813,823, filed as application No. PCT/IB2011/053298 on Jul. 25, 2011, now Pat. No. 9,403,313.

(30) Foreign Application Priority Data

Aug. 2, 2010  (IT) .............................. MO2010A0224
Aug. 2, 2010  (IT) .............................. MO2010A0225

(Continued)

(51) Int. Cl.
*B29C 51/42*       (2006.01)
*B29B 13/02*       (2006.01)
(Continued)

(52) U.S. Cl.
CPC .......... *B29C 51/421* (2013.01); *B29B 13/023* (2013.01); *B29C 51/425* (2013.01);
(Continued)

(58) Field of Classification Search
CPC ..... B29C 51/421; B29C 51/18; B29C 51/264; B29C 51/425; B29C 51/46;
(Continued)

(56) References Cited

U.S. PATENT DOCUMENTS 3,281,957 A     11/1966  Ranney et al.
3,331,908 A *   7/1967  Shelby .................. B29C 51/422
                                                        264/322

(Continued)

FOREIGN PATENT DOCUMENTS

CH          695724 A5     8/2006
DE          1151922 B     7/1963
(Continued)

*Primary Examiner* — Alison L Hindenlang
*Assistant Examiner* — Jerzi H Moreno Hernandez
(74) *Attorney, Agent, or Firm* — Laubscher, Spendlove & Laubscher, P.C.

(57) ABSTRACT

A forming apparatus for forming objects by forming a sheet of thermoformable material includes a thermal conditioning station including a kiln for heating the material to an operating temperature, and a heating station positioned downstream of the thermal conditioning station and including a heating device to heat set portions of the material to a temperature near a softening temperature of the material. In order to reduce reject material at the restart of the apparatus following machine downtime, the kiln and the heating device are positioned near one another in such a manner that a part of the material interposed between the thermal conditioning station and the heating station is heated by the heat generated by a kiln and/or by the heating device.

2 Claims, 12 Drawing Sheets

(30) Foreign Application Priority Data

Aug. 2, 2010 (IT) .............................. MO2010A0226
Aug. 2, 2010 (IT) .............................. MO2010A0227

(51) Int. Cl.
*B29C 51/46* (2006.01)
*B29K 23/00* (2006.01)
*B29C 51/18* (2006.01)

(52) U.S. Cl.
CPC .............. *B29C 51/46* (2013.01); *B29C 51/18* (2013.01); *B29K 2023/12* (2013.01)

(58) Field of Classification Search
CPC ............ B29C 49/6409; B29C 66/8744; B29B 13/023; B29K 2023/12; B29K 2105/256
See application file for complete search history.

(56) References Cited

U.S. PATENT DOCUMENTS

| | | | |
|---|---|---|---|
| 4,172,869 A * | 10/1979 | Oishi | B29C 44/12 264/134 |
| 4,209,957 A * | 7/1980 | Utzmann | B29C 51/18 264/101 |
| 4,306,856 A * | 12/1981 | Arippol | B29B 13/023 264/234 |
| 4,668,181 A | 5/1987 | Bernauer | |
| 4,778,372 A | 10/1988 | Mutti et al. | |
| 4,792,426 A | 12/1988 | Greatorex et al. | |
| 4,892,689 A | 1/1990 | Cappellen et al. | |
| 5,125,994 A | 6/1992 | Harasta et al. | |
| 5,268,136 A | 12/1993 | Girard et al. | |
| 5,849,227 A | 12/1998 | Chikugo et al. | |
| 2004/0104506 A1 | 6/2004 | Schelmbauer et al. | |
| 2009/0021550 A1 | 1/2009 | Leighton et al. | |
| 2011/0101556 A1 | 5/2011 | Bach et al. | |

FOREIGN PATENT DOCUMENTS

| | | | |
|---|---|---|---|
| FR | 1457153 A | 10/1966 | |
| FR | 2829993 A1 | 3/1973 | |
| FR | 2829993 A1 * | 3/2003 | .......... B29B 13/023 |
| GB | 1051398 A | 12/1966 | |
| WO | 2004089589 A2 | 10/2004 | |

* cited by examiner

FORMING APPARATUS, HEATING STATION AND METHOD FOR HEATING SET PORTIONS

This application is a division of U.S. patent application Ser. No. 13/813,823 filed Feb. 1, 2013 (with an effective filing date of Mar. 29, 2013). Application Ser. No. 13/813,823 is a § 371 National Stage Entry of PCT International Application No. PCT/IB2011/053298 filed Jul. 25, 2011. PCT/IB2011/053298 claims priority to IT Application Nos. MO2010A000227 filed Aug. 2, 2010, MO2010A000226 filed Aug. 2, 2010, MO2010A000225 filed Aug. 2, 2010 and MO2010A000224 filed Aug. 2, 2010. The entire content of these applications is incorporated herein by reference.

BACKGROUND OF THE INVENTION

The invention relates to a forming apparatus for forming objects from a thermoformable sheet material, for example polypropylene.

The invention further relates to heating stations that are insertible into a forming apparatus arranged for forming objects by forming a thermoformable sheet material, for example polypropylene.

Also, the invention relates to a method for heating set portions of a thermoformable sheet material following a machine downtime of a forming apparatus.

BRIEF DESCRIPTION OF THE PRIOR ART

Forming apparatuses for forming objects by forming a thermoformable sheet material are known that comprise a system for advancing in an indexed manner the thermoformable sheet material.

This material is unwound from a reel and is initially passed through a thermal conditioning station.

The thermal conditioning station comprises a kiln arranged for heating the material to an operating temperature that is sufficient for preheating the material throughout the thickness thereof, i.e. as far as the innermost part thereof, or, as commonly said in the technical field, as far as the "heart".

Subsequently, this preheated material is passed through a heating station positioned at a certain distance from, and downstream of the thermal conditioning station.

The heating station includes a plurality of heatable plates arranged in pairs along a horizontal advancing direction of the material through the heating station.

In particular, the plates of each pair are positioned on opposite sides of the thermoformable sheet material, such as to heat opposite faces thereof.

All the pairs of plates are simultaneously drivable between an operating position in which both plates of each pair contact the material to heat the material and a non-operating position in which the plates of each pair are at a certain distance from the material.

Also subsequently, the material that is thus softened is passed through a forming station in which it is deformed plastically to obtain the desired objects.

One drawback of the aforesaid apparatuses relates to the significant quantity of material to be rejected at the restart of the forming apparatus after a more or less protracted machine downtime.

This is due to the fact that at the restart the part of the material interposed between the thermal conditioning station and the heating station is no longer usable and is therefore to be rejected because during the stop it cools to a temperature at which it is no longer possible to reheat it homogeneously, i.e. to ensure the appropriate physical and mechanical properties thereof, in the heating station.

A further drawback of such forming apparatuses is the significant energy waste thereof.

In fact, the heat generated by the aforesaid plates in the non-operating position, i.e. in the position in which they are following a machine downtime, is dispersed in the surrounding environment.

One drawback of the aforesaid heating station relates to the significant quantity of material to be rejected at the restart of the forming apparatus after a more or less protracted machine downtime.

This is due to the fact that at the restart the part of the material contained in the heating station is no longer reusable and is thus to be rejected.

In fact, following the restart of the forming apparatus, only the portion of material positioned at a first pair of plates positioned further upstream of the advancing direction is reheated for a set time to ensure subsequent satisfactory forming, inasmuch as this portion, advancing the material in an indexed manner, is subsequently heated also by all the subsequent pairs of plates, positioned downstream of the first pair of plates along the advancing direction, up to a temperature that is such as to permit the softening and plastic deformation thereof.

Vice versa, the remaining portions of material positioned downstream of this portion along the advancing direction are gradually heated by a decreasing number of pairs of plates, this entailing inappropriate heating, inasmuch as the heating is for a shorter time than the set time, for subsequent forming.

In other words, these portions are not heated by the pairs of plates positioned upstream of the portions, along the advancing direction.

Further, in a machine downtime condition, the plates are positioned in the non-operating position, i.e. they are distant from one another. This, together with the force of gravity, causes deformation of the material, which is arranged over a curved surface, i.e. it "bellies".

This deformation compromises the physical and mechanical properties of this part of the material that cannot be subsequently formed efficiently and thus has to be rejected. Also, the part of material contained in the heating station during the stop cools to a temperature at which it is not subsequently possible to heat this part evenly, i.e. to ensure suitable physical and mechanical properties in the heating station.

A further drawback of this heating station is the significant energy waste associated therewith.

In fact, the heat generated by the aforesaid plates in the non-operating position, i.e. in the position in which they are following a machine downtime, is dispersed from the heating station in the surrounding environment.

SUMMARY OF THE INVENTION

One object of the present invention is to improve forming apparatuses for forming objects from thermoformable sheet material.

A further object is to provide forming apparatuses that compared with known apparatuses enables rejects of material to be reduced after restarts following machine downtimes.

A still further object is to obtain forming apparatuses that enable energy consumption to be optimised. Another object of the present invention is to improve the heating stations that are includable in forming apparatuses arranged for forming objects from thermoformable sheet material.

A further object is to provide heating stations that are includable in forming apparatuses arranged for forming objects from thermoformable sheet material that compared with known apparatuses enable rejects of material to be reduced after restarts following machine downtimes.

A still further object is to obtain heating stations that are includable in forming apparatuses arranged for forming objects from thermoformable sheet material that enable energy-consumption to be optimised.

Another further object is to provide a method for heating set portions of a thermoformable sheet material that compared with known methods enables rejects of material to be reduced after restarts following machine downtimes.

Such objects and still others are all achieved by a forming apparatus and by a heating station made according to one or more of the following claims.

BRIEF DESCRIPTION OF THE FIGURES

The invention can be better understood and implemented with reference to the attached drawings, which illustrate some embodiments thereof by way of non-limiting example, in which.

DETAILED DESCRIPTION

Figure 1:
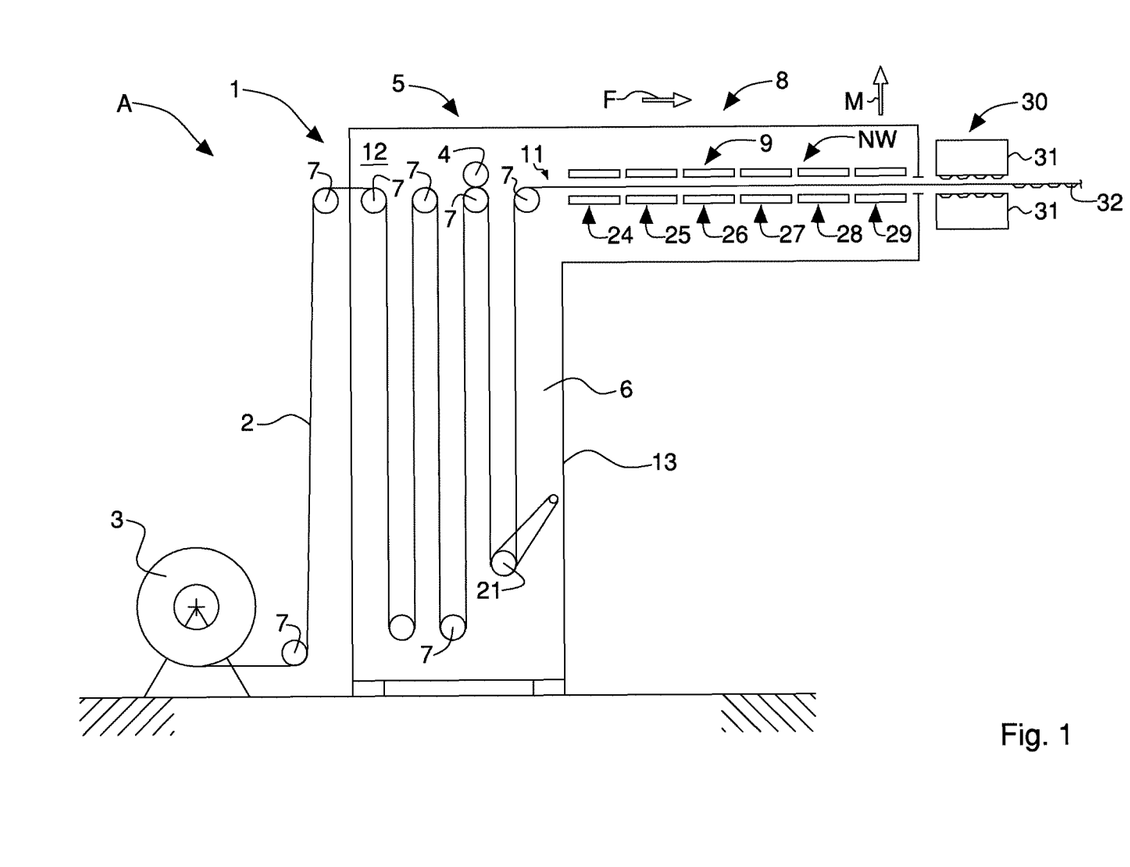
FIG. 1 is a schematic frontal view of a forming apparatus according to the invention in a first embodiment.

With reference to FIG. 1 there is shown a first embodiment A of a forming apparatus 1 arranged for forming objects 32 from a thermoformable sheet material, for example polypropylene.

The material 2 is unwound from a reel 3 and moved, for example in an indexed manner, by an advancing device along an advancing direction F through a plurality of operating stations.

In particular, this advancing device includes a driven roller 4, a plurality of rollers 7, or gears, and a guide pulley 21. The aforesaid operating stations comprise a thermal conditioning station 5 through which the material 2 is advanced.

The thermal conditioning station 5 comprises a kiln 6 arranged for heating the material 2 to an operating temperature that is sufficient for preheating the material 2 throughout the entire thickness thereof, i.e. as far as the innermost part thereof, or, as it is commonly called in the technical field, as far as the "heart".

Inside the thermal conditioning station 5, the rollers 7, or gears, are positioned in such a manner as to make the material 2 travel along a sufficiently long path in the kiln 6 as to be heated to the desired operating temperature, whilst the guide pulley 21 is positioned in such a manner as to maintain the material 2 taut both during advancing of the latter in an indexed manner and during a machine downtime. The aforesaid operating stations further comprise a heating station 8, positioned downstream of the thermal conditioning station 5, through which the material is advanced 2 that was previously heated by the kiln 6.

The heating station 8 is provided with a heating device 9 that is positioned in succession along the substantially horizontal advancing direction F, of the material 2 through the heating station 8, to heat set portions 23 (FIGS. 2 and 3) of the material 2 to a temperature near a softening temperature of the material 2.

In particular, the kiln 6 and the heating device 9 are positioned near one another in such a manner that a part 11 of the material 2 interposed between the thermal conditioning station 5 and the heating station 8 is heated by the heat generated by the kiln 6 and/or by the heating device 9.

In the first embodiment A, the apparatus 1 includes a single heating chamber 12, bounded by a thermally insulated case 13 housing both the kiln 6 and the heating device 9.

In this manner, when the apparatus 1 restarts after a more or less protracted machine downtime, the part 11 of the material 2 is still usable.

In fact, this part 11 is maintained by the aforesaid heat generated by the kiln 6 and/or by the heating device 9 at a temperature that is even and sufficient for ensuring, at the restart, suitable physical and mechanical properties for correct subsequent forming.

Further, the apparatus 1 enables significant energy to be saved, inasmuch as the heat dispersed by the heating device 9 is used to heat the heating chamber 12, inasmuch as, owing to the thermally insulated case 13, it is not dispersed in the environment as occurs in known apparatuses.

Figure 4:
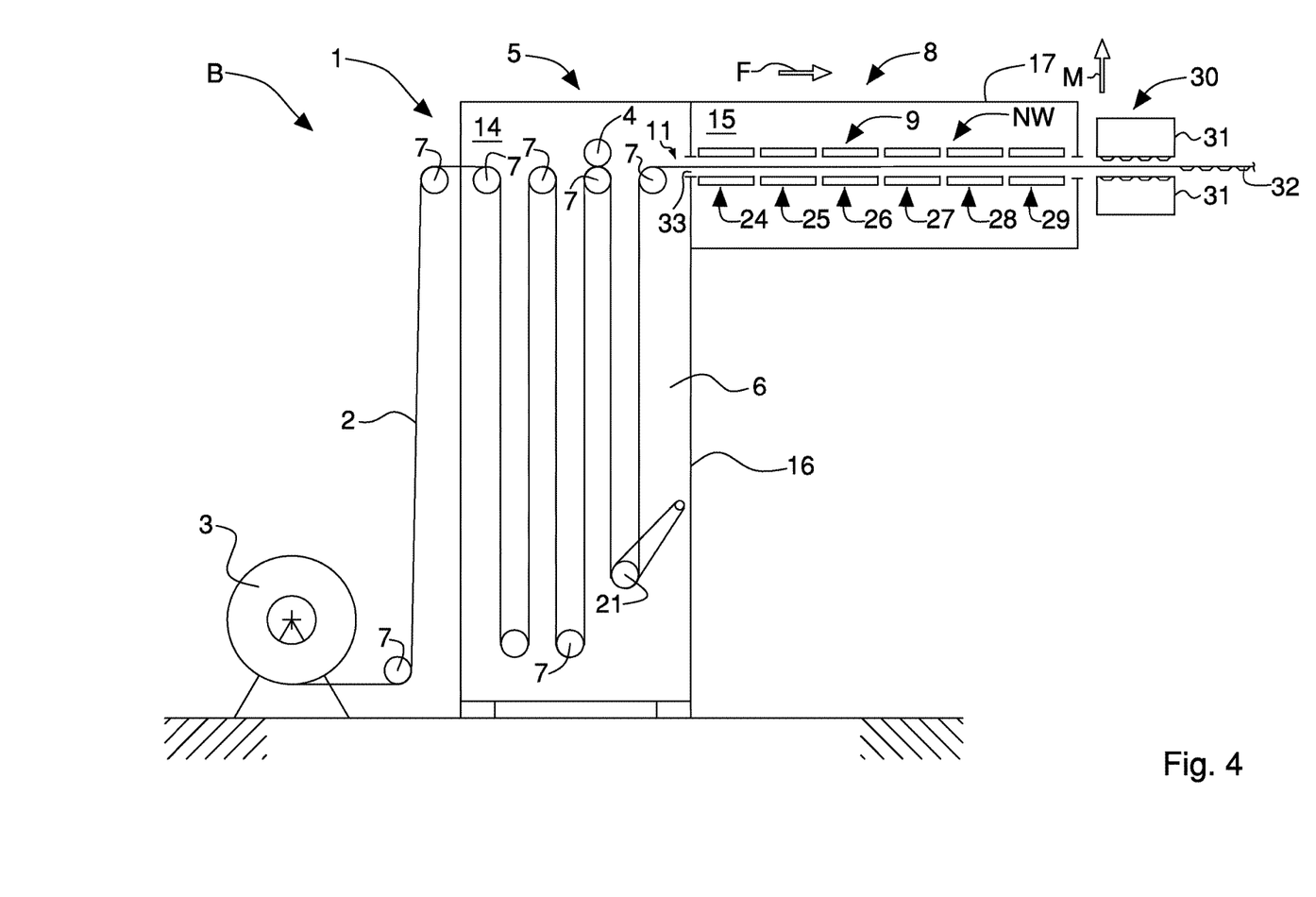
FIG. 4 is a schematic frontal view of a forming apparatus according to the invention in a second embodiment.

In a second embodiment B, shown in FIG. 4, the apparatus 1 includes, instead of the single heating chamber 12, a first heating chamber 14 for housing the kiln 6 and a second heating chamber 15, communicating with the first heating chamber 14, for housing the heating device 9.

In particular, the first heating chamber 14 is bounded by a thermally insulated first case 16, whereas the second heating chamber 15 is bounded by a second case 17, which is also thermally insulated and contiguous with, more precisely in contact with, the first case 16, a passage 33 for the material 2 being provided between the first case 16 and the second case 17.

Figure 5:
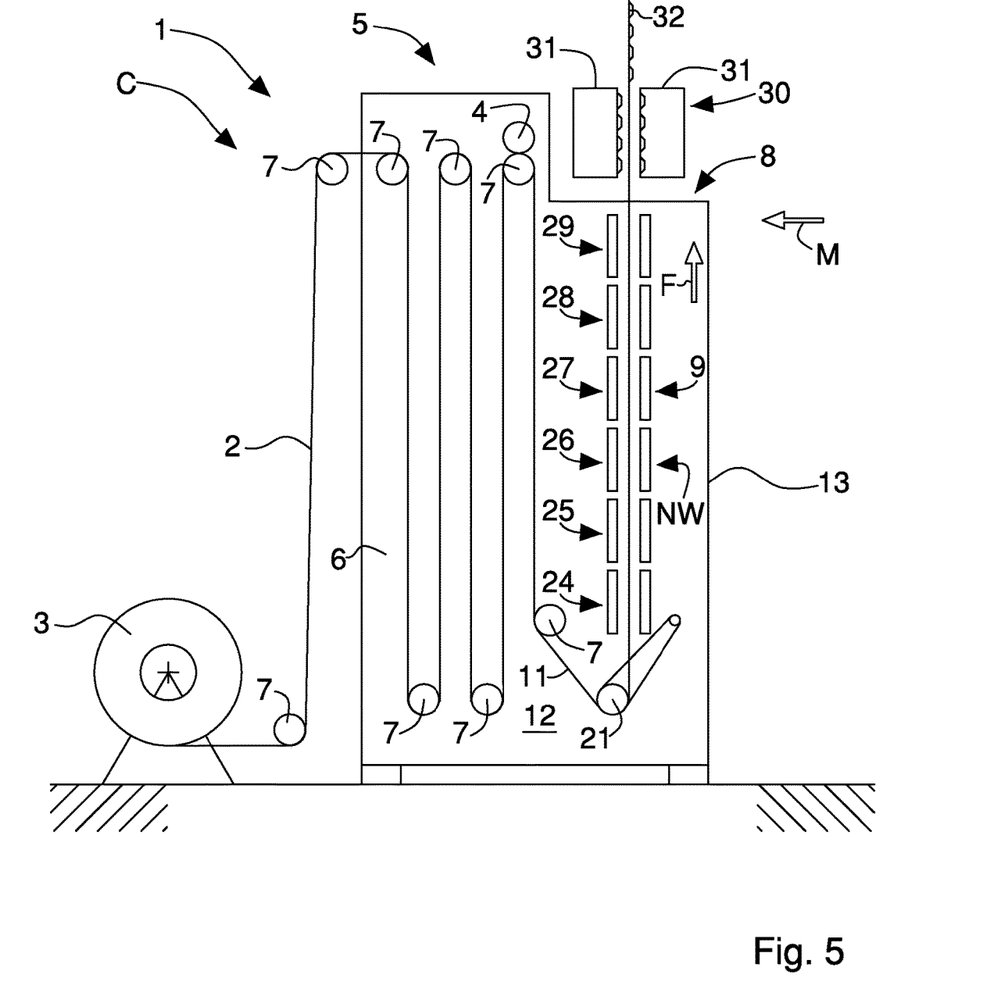
FIG. 5 is a schematic frontal view of a forming apparatus according to the invention in a third embodiment.

A third embodiment C, shown in FIG. 5, is a version of the first embodiment A.

The third embodiment C differs from the first embodiment A inasmuch as the advancing direction F of the material 2 through the heating station 8 is substantially vertical.

Consequently, in the third embodiment C, the heating device 9 is positioned substantially vertically.

In this manner, at the restart of the apparatus 1 after a more or less protracted machine downtime, a portion 20 of the material 2 is still usable that is contained, at the moment of the machine downtime, in the heating station 8.

In fact, this portion 20, during the machine downtime, remains arranged, owing to the force of gravity, along a substantially vertical and flat surface, this ensuring, at the restart, suitable physical and mechanical properties of this portion 20 for correct subsequent forming.

Further, in the third embodiment C, the guide pulley 21 is positioned in the heating station 8 upstream of the heating device 9 along the advancing direction F so as to maintain the material 2 taut both during advancing of the latter in an indexed manner and during a machine downtime.

In this manner, the guide pulley 21, together with the force of gravity, contributes to maintaining the portion 20 arranged along the aforesaid surface substantially vertical and flat, in particular during the machine downtimes.

Figure 8:
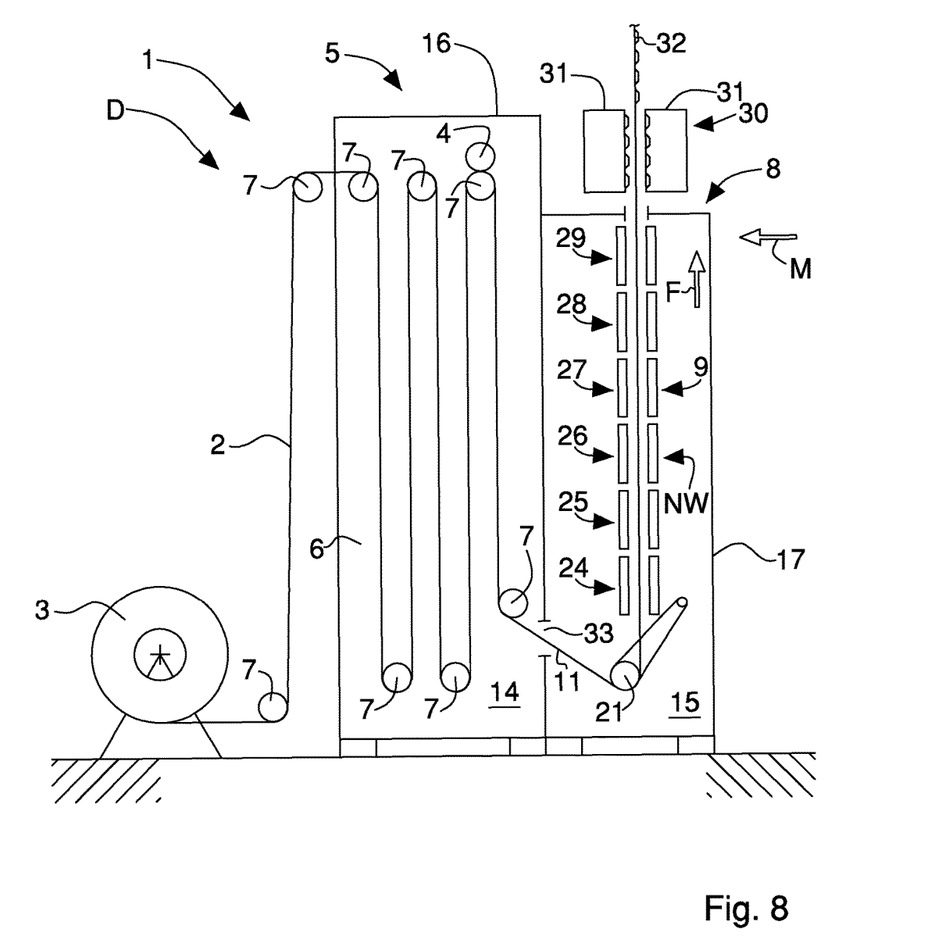
FIG. 8 is a schematic frontal view of a forming apparatus according to the invention in a fourth embodiment.

A fourth embodiment D, shown in FIG. 8, is a version of the second embodiment B.

This fourth embodiment D differs from the second embodiment B inasmuch as the advancing direction F of the material 2 through the heating station 8 is substantially vertical.

In this manner, also in the fourth embodiment D, the heating device 9 is positioned substantially vertically.

Also in the fourth embodiment D, the guide pulley 21 is positioned in the heating station 8 upstream of the heating device 9 along the advancing direction F, such as to keep the material 2 taut both during advancing of the latter in an indexed manner and during a machine downtime.

Figure 9:
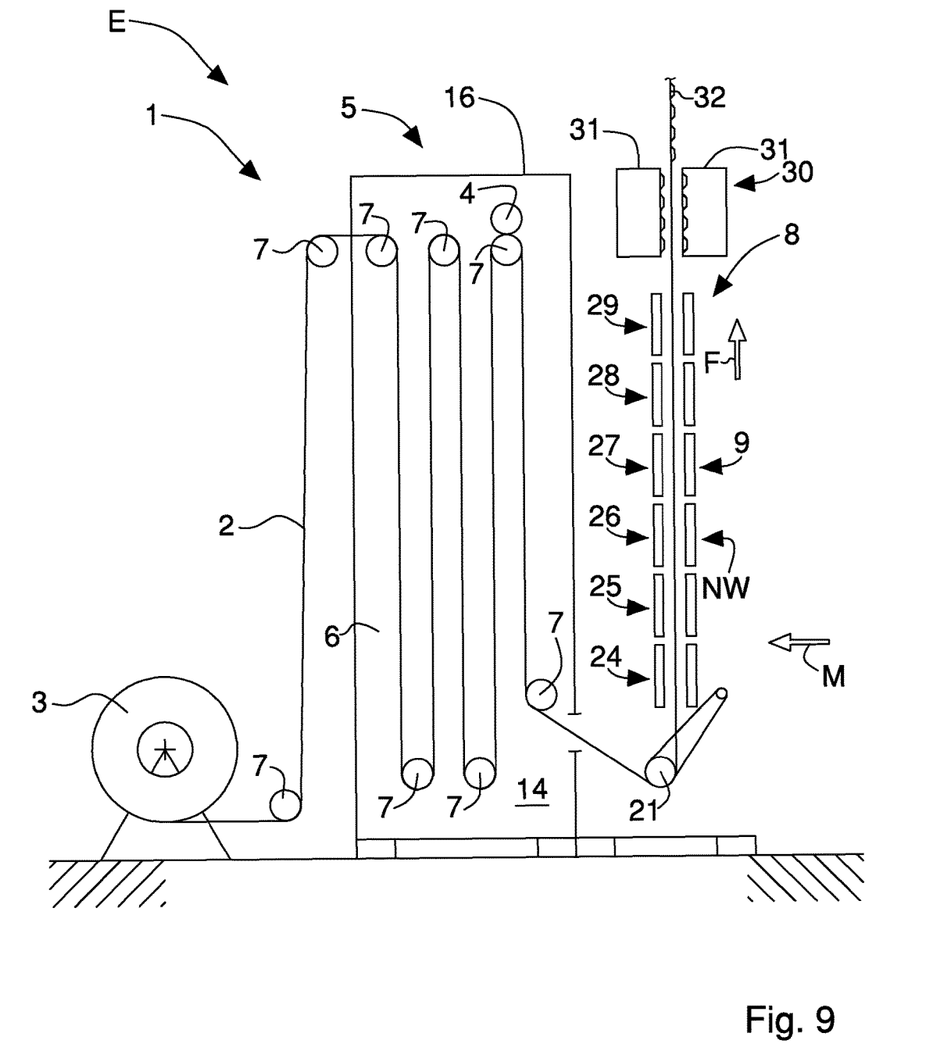
FIG. 9 is a schematic frontal view of a forming apparatus according to the invention in a fifth embodiment.

A fifth embodiment E, shown in FIG. 9, is a version of the fourth embodiment D.

This fifth embodiment E differs from the fourth embodiment D inasmuch as the apparatus 1 does not include the second heating chamber 15, communicating with the first heating chamber 14, for housing the heating device 9.

In other words, in the fifth embodiment E only the thermally insulated first case 16 is provided, which bounds the first heating chamber 14 in which the kiln 6 is housed.

Also in the fifth embodiment E the heating device 9 is positioned substantially vertically.

Figure 6:
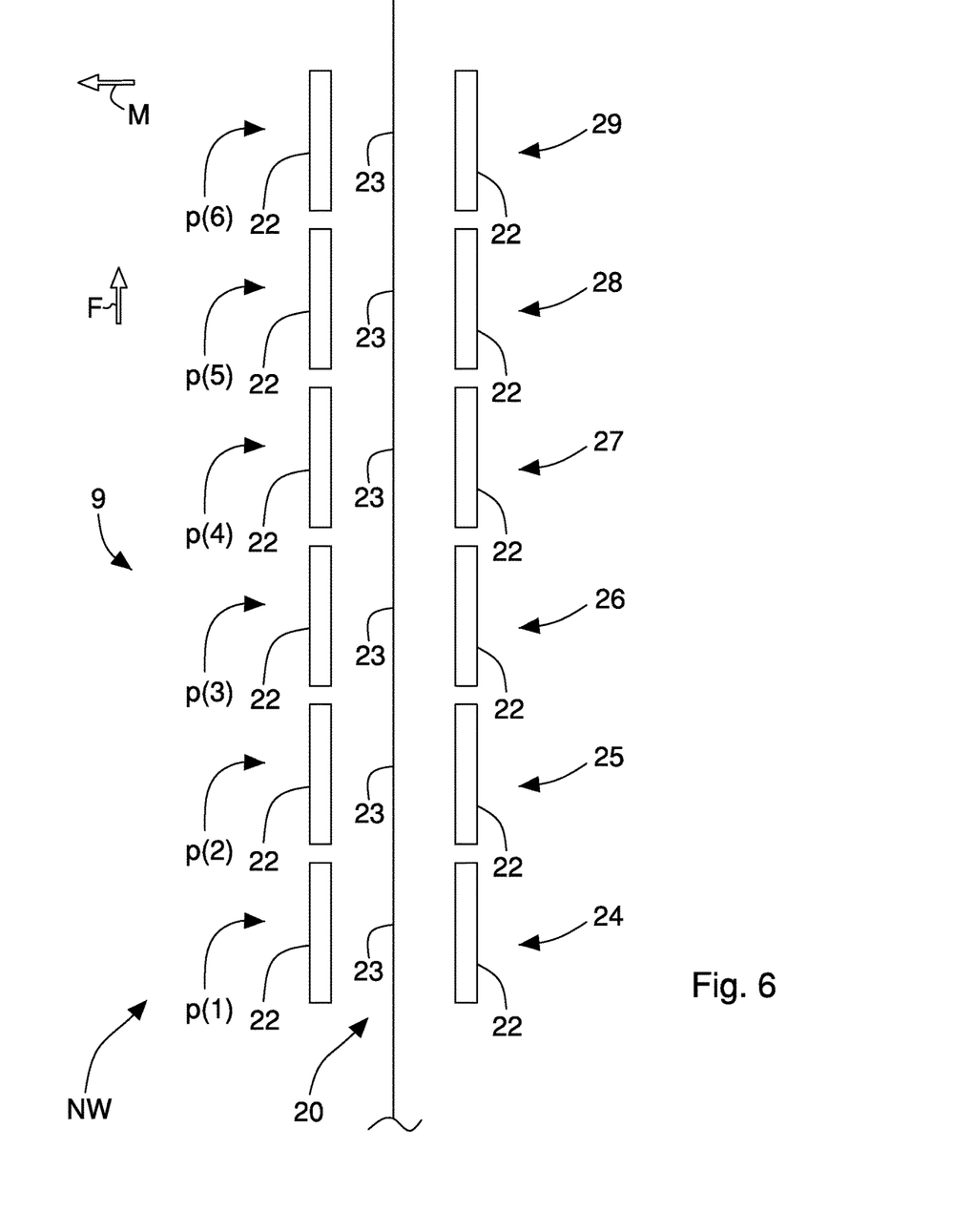
FIG. 6 is an enlarged detail of FIG. 5.
Figure 7:
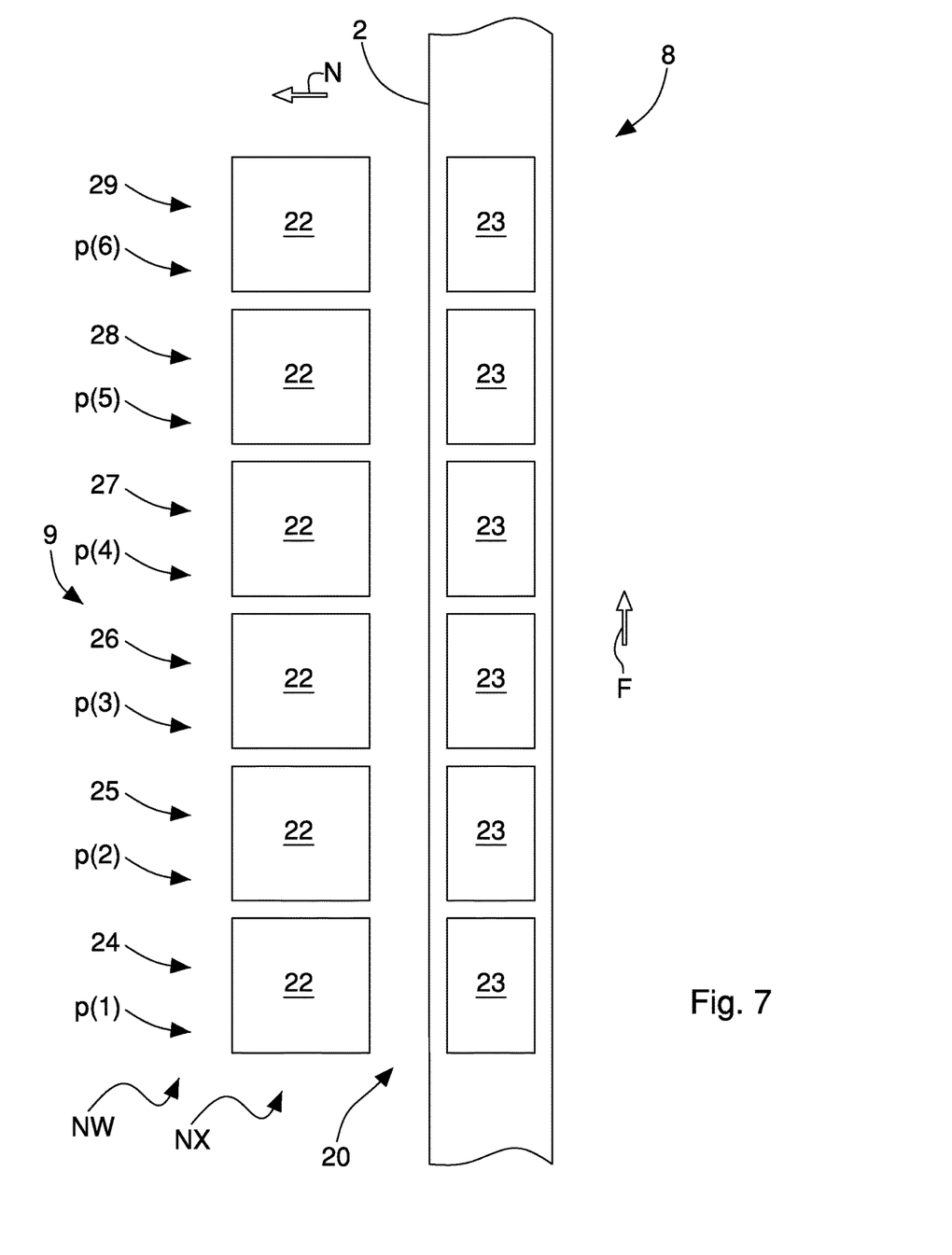
FIG. 7 is a plan view of the enlarged detail in FIG. 5.

In this manner, at the restart of the apparatus 1 after a more or less protracted machine downtime, a portion 20 of the material 2 is still usable, which is contained, at the moment of the machine downtime, in the heating station 8 (FIGS. 6 and 7).

In fact, this portion 20, during the machine downtime, is arranged, owing to the force of gravity, along a substantially vertical and flat surface, this ensuring, at the restart, suitable physical and mechanical properties of this portion 20 for correct subsequent forming.

Further, also in the fifth embodiment E, the heating station 8 comprises a guide pulley 21 for maintaining the material 2 taut both during advancing of the latter in an indexed manner, and during a machine downtime.

In this manner, the guide pulley 21, together with the force of gravity, contributes to maintaining the portion 20 arranged along the aforesaid substantially vertical and flat surface, in particular during the machine downtimes.

Figure 10:
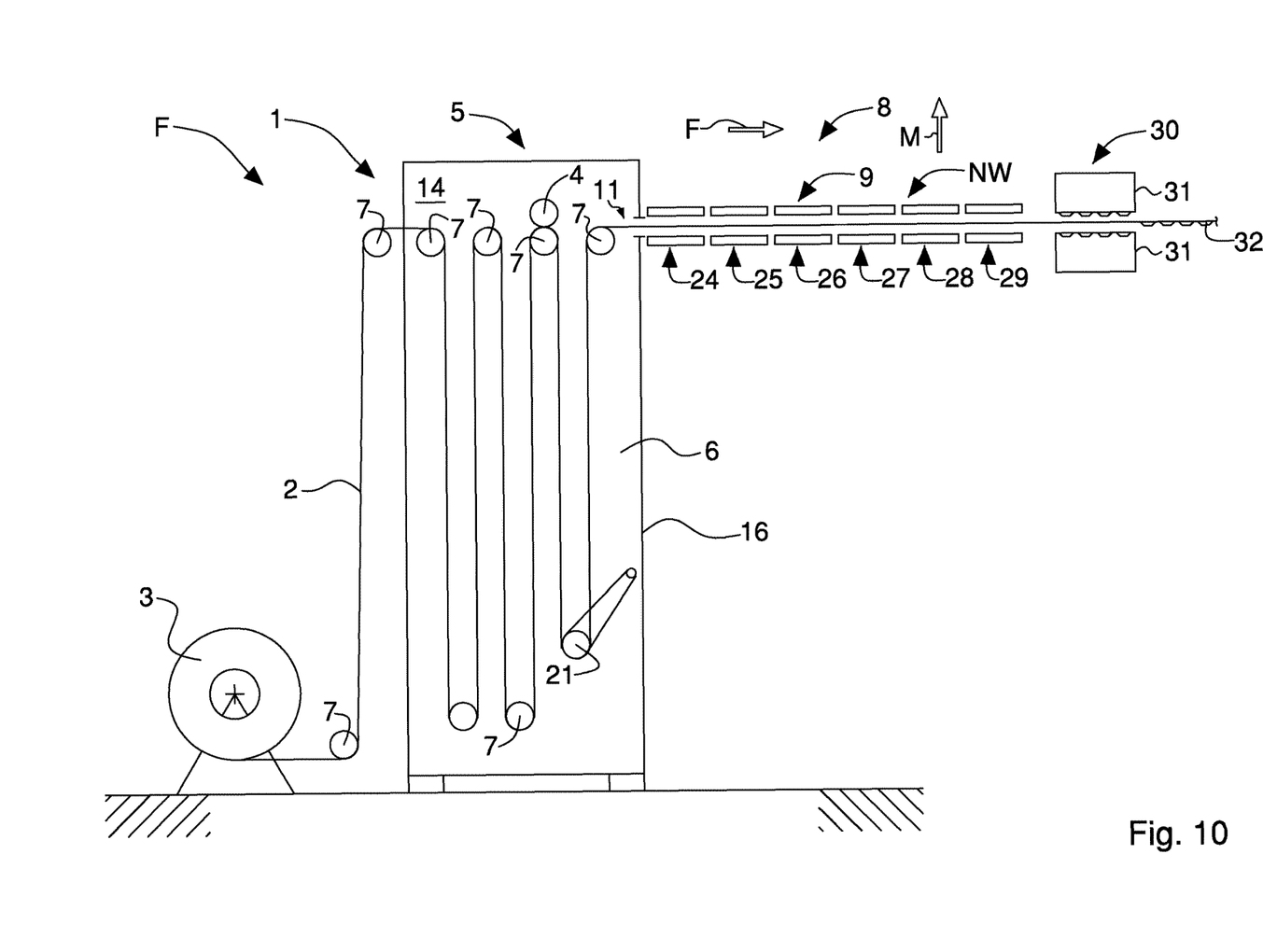
FIG. 10 is a schematic frontal view of a forming apparatus according to the invention in a sixth embodiment.

A sixth embodiment F, shown in FIG. 10, is a version of the second embodiment B.

This sixth embodiment F differs from the second embodiment B inasmuch as the apparatus 1 does not include the second heating chamber 15, communicating with the first heating chamber 14, for housing the heating device 9.

In other words, in the sixth embodiment F there is provided only the thermally insulated first case 16, bounding the first heating chamber 14 in which the kiln 6 is housed.

Also in the sixth embodiment F, the heating station 8 comprises the guide pulley 21 for maintaining the material 2 taut both during advancing of the latter in an indexed manner, and during a machine downtime.

Figure 11:
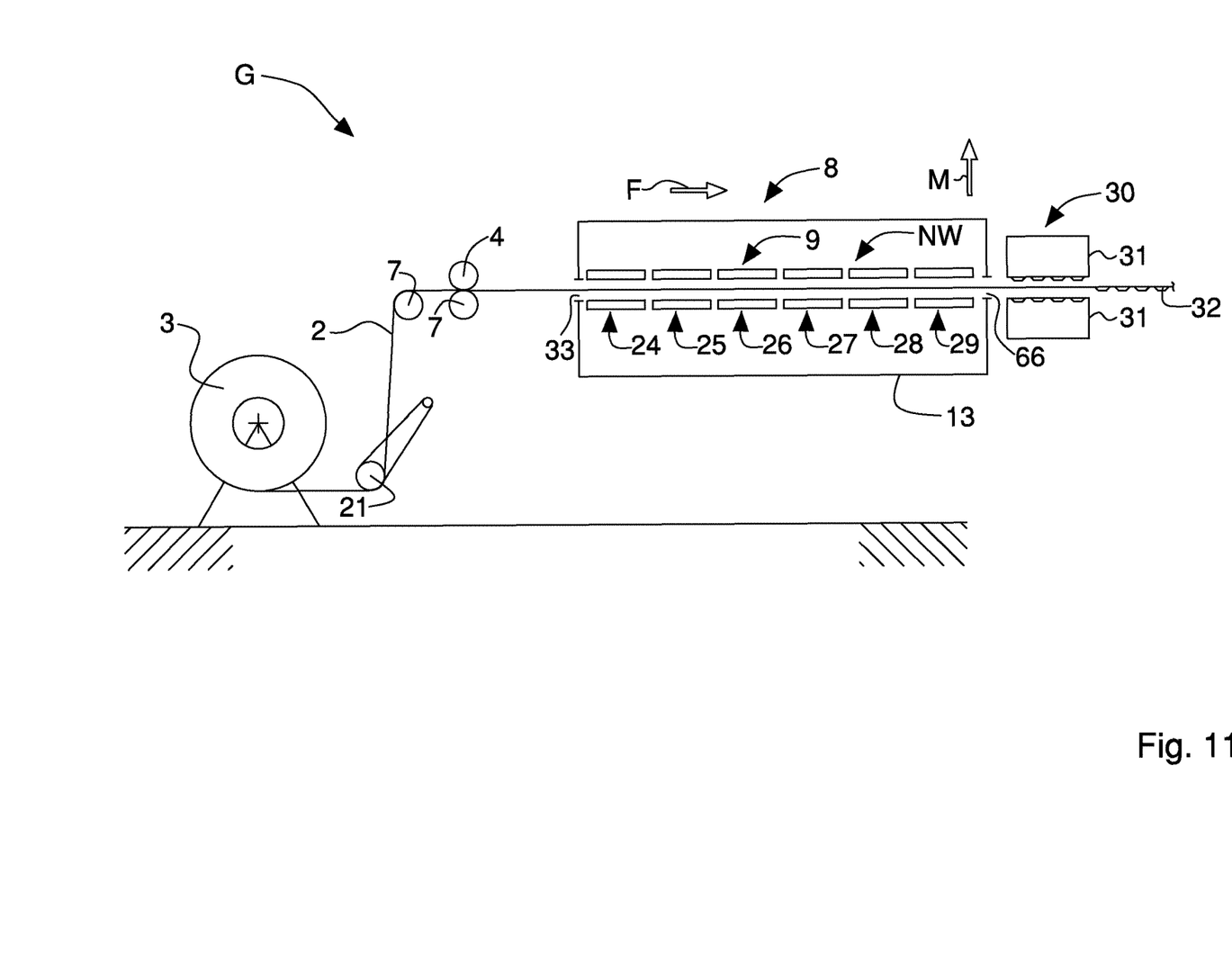
FIG. 11 is a schematic frontal view of a forming apparatus according to the invention in a seventh embodiment.

A seventh embodiment G is shown in FIG. 11.

In the seventh embodiment G, the apparatus 1 is devoid of the kiln 6.

Also, in the seventh embodiment G, the material 2 is unwound from a reel 3 and moved, for example in an indexed or intermittent manner, by an advancing device along an advancing direction F through a plurality of operating stations.

In particular, this advancing device includes a driven roller 4, a plurality of rollers 7, or gears, and a guide pulley 21. The guide pulley 21 is positioned in such a manner as to maintain the material 2 taut both during advancing of the latter in an indexed manner, and during a machine downtime.

The heating station 8 is provided with a heating device 9 which is positioned in succession along the substantially horizontal advancing direction F of the material 2 through the heating station 8, to heat set portions 23 (FIGS. 2 and 3) of the material 2 to a temperature near a softening temperature of the material 2.

The heating station 8 further includes a thermally insulated case 13 that houses the heating device 9.

In particular, the case 13 has a substantially parallelpipedon shape and comprises an inlet 33 and an outlet 66 for the material 2.

In this manner, at the restart of the apparatus 1 after a more or less protracted machine downtime, a portion 20 of the material 2 is still usable that is contained, at the moment of the machine downtime, in the heating station 8.

In fact, this portion 20 is maintained by the heat generated by the heating device 9 at a temperature that is even and sufficient to ensure, at the restart, suitable physical and mechanical properties for correct subsequent forming.

Further, the heating station 8, provided with the thermally insulated case 13, permits a significant energy saving, inasmuch as the heat dispersed by the heating device 9 is used to maintain the aforesaid portion 20 heated and is not dispersed in the environment as occurs in known heating stations.

Figure 12:
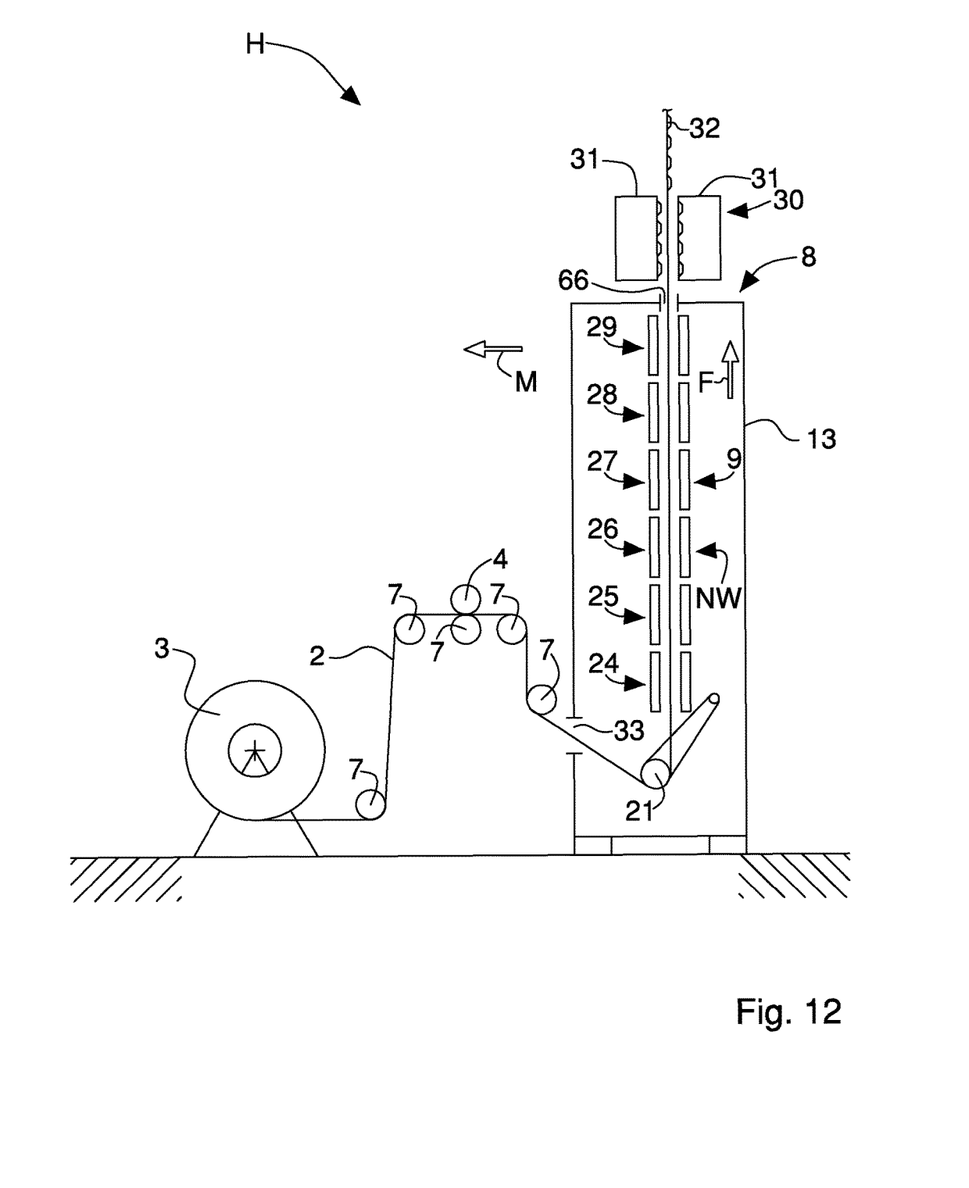
FIG. 12 is a schematic frontal view of a forming apparatus according to the invention in an eighth embodiment.

An eighth embodiment H is shown in FIG. 12.

In the eighth embodiment H, the apparatus 1 is devoid of the kiln 6.

Also, in the eighth embodiment H, the advancing direction F of the material 2 through the heating station 8 is substantially vertical.

Consequently, the heating device 9 is positioned substantially vertically.

In this manner, at the restart of the apparatus 1 after a more or less protracted machine downtime, a portion 20 of the material 2 is still usable that is contained, at the moment of the machine downtime, in the heating station 8 (FIGS. 6 and 7).

In fact, this portion 20, during the machine downtime, is arranged, owing to the force of gravity, along a substantially vertical and flat surface, this ensuring, at the restart, suitable physical and mechanical properties of this portion 20 for correct subsequent forming.

In this embodiment the guide pulley 21 is positioned in the heating station 8 upstream of the heating device 9 along the advancing direction F so as to maintain the material 2 taut both during advancing of the latter in an indexed manner, and during a machine downtime.

In this manner, the guide pulley 21, together with the force of gravity, contributes to maintaining the portion 20 arranged along the aforesaid substantially vertical and flat surface, in particular during the machine downtimes.

The aforesaid heating device 9 includes a plurality of pairs of plates 24, 25, 26, 27, 28 and 29 (FIGS. 2, 3, 6 and 7).

In particular, the heating device 9 includes a first pair of plates 24, a second pair of plates 25, a third pair of plates 26, a fourth pair of plates 27, a fifth pair of plates 28 and a sixth pair of plates 29 arranged in succession along the advancing direction F.

These pairs of plates 24, 25, 26, 27, 28 and 29 are positioned such that the first pair of plates 24 is positioned further upstream of the advancing direction F with respect to the remaining pairs of plates 25, 26, 27, 28 and 29.

Each pair of plates 24, 25, 26, 27, 28 and 29 comprises two heatable plates 22 that face one another and are positioned on opposite sides of the material 2, such as to heat opposite faces thereof.

In use, the plates 22 of each pair of plates 24, 25, 26, 27, 28 and 29 are movable along a movement direction M that is substantially perpendicular to the advancing direction F, this movement direction M being substantially vertical in the first embodiment A, in the second embodiment B, in the sixth embodiment F and in the seventh embodiment G, and being substantially horizontal in the third embodiment C, in the fourth embodiment D, in the fifth embodiment and in the eighth embodiment H.

Figure 2:
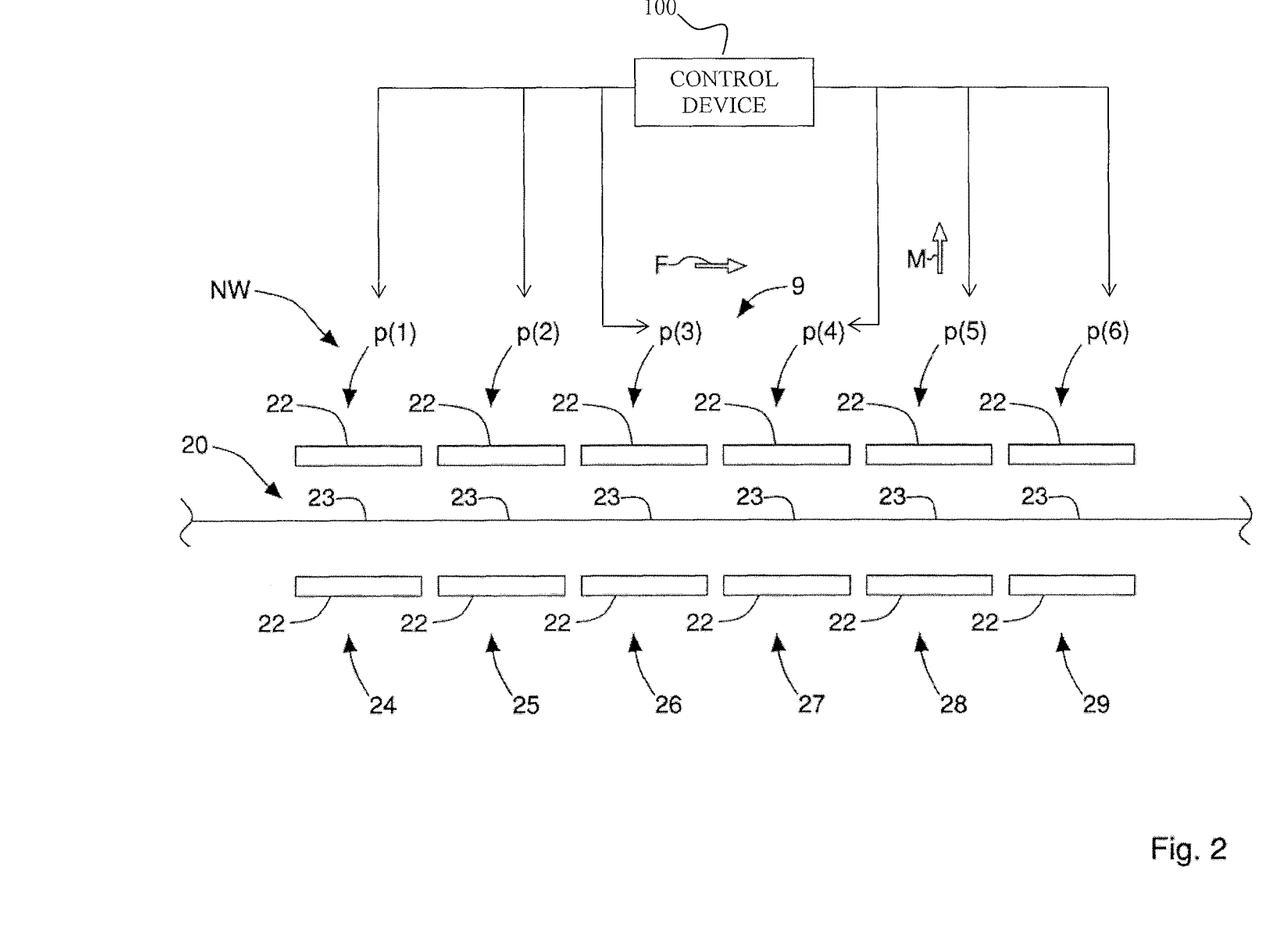
FIG. 2 is an enlarged detail of FIG. 1.
Figure 3:
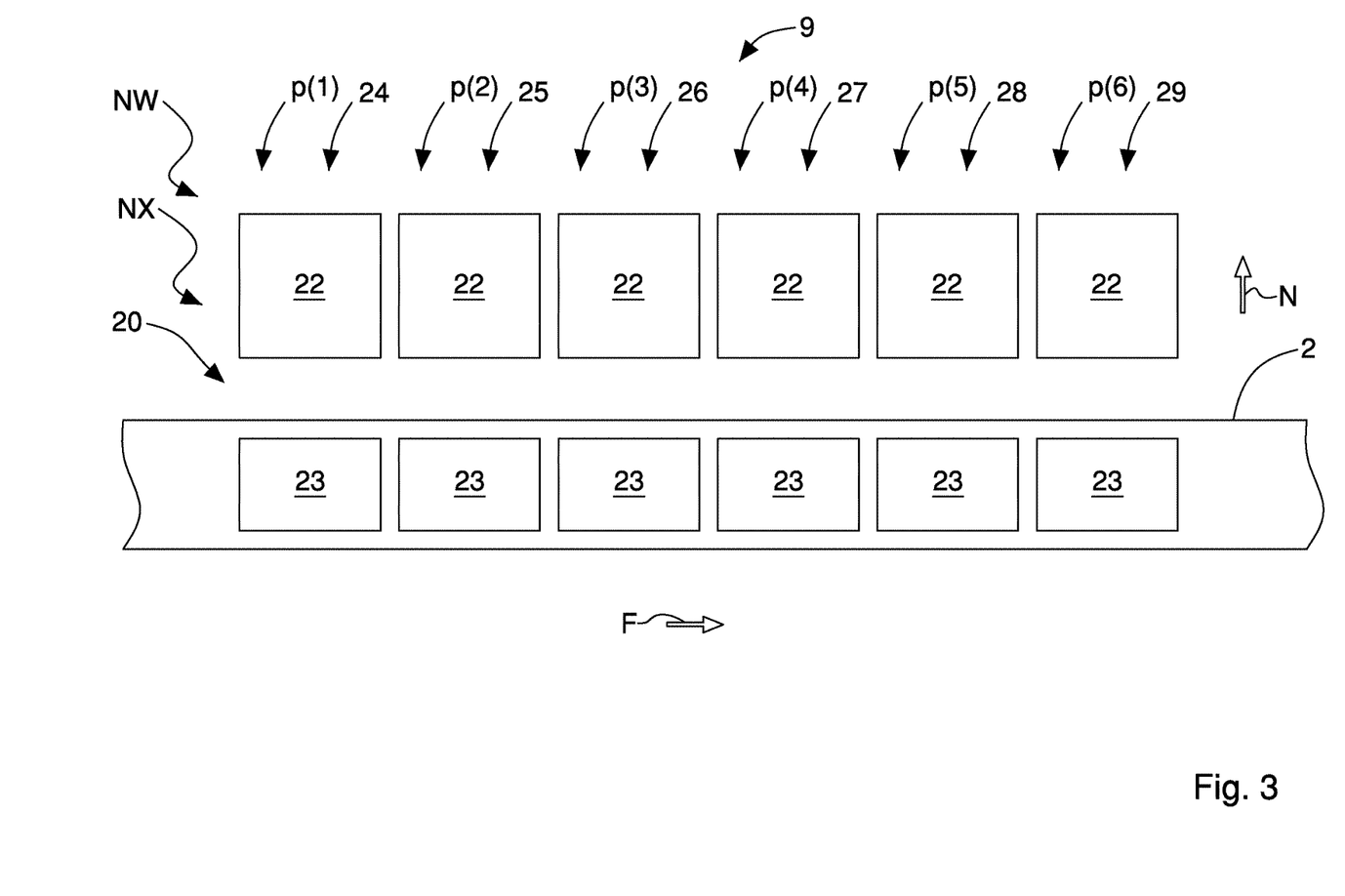
FIG. 3 is a plan view of the enlarged detail in FIG. 2.

In particular, the plates 22 of each pair of plates 24, 25, 26, 27, 28 and 29 are movable along the movement direction M, moving towards and away from one another between an operating position, which is not shown, in which they contact and heat the material 2 substantially to the softening temperature, and a non-operating position NW, shown in FIGS. 1 to 12, in which they are at a certain distance from the material 2. Also, in use, each pair of plates 24, 25, 26, 27, 28 and 29 is movable along a further movement direction N that is substantially horizontal and perpendicular to the advancing direction F and to the movement direction M (FIGS. 3 and 7).

In particular, each pair of plates 24, 25, 26, 27, 28 and 29 is movable along the further movement direction N between a first position, which is not shown, in which the plates 22 of each pair of plates 24, 25, 26, 27, 28 and 29 face, and are at a certain distance along the movement direction M from the respective portions 23 of the material 2, and a second position NX, shown in FIGS. 3 and 7, in which they are mutually facing and positioned laterally with respect to the material 2.

More precisely, the pairs of plates 24, 25, 26, 27, 28 and 29 are positioned in the second position NX during the machine downtimes, in such a manner as not to overheat, during the machine downtimes, the respective portions 23 of the material 2 contained, at the moment of the machine downtime, in the heating station 8.

The heating station 8 further comprises a control device 100, which is shown in FIG. 2, for driving each pair p(1)-p(6) of plates 24, 25, 26, 27, 28 and 29, respectively, between the operating position and the non-operating position NW.

In a normal operating step, the controlling device simultaneously drives the pairs of plates 24, 25, 26, 27, 28, 29, maintaining each in the respective operating position for a time set by the following formula:

$$t_{running} = t_{heating}/n, \text{ where:}$$

$t_{running}$=time for which the pairs of plates 24, 25, 26, 27, 28 and 29 are maintained at running speed in the respective operating positions;

theating=total heating time required for softening the set portions 23 of the portion 20 that are positioned at each pair of plates 24, 25, 26, 27, 28, 29 and are intended for being subsequently deformed plastically;

n=number of pairs of plates 24, 25, 26, 27, 28, 29 (in this case n=6).

Conversely, in an apparatus 1 restart step following a machine downtime, the controlling device drives the pairs of plates 24, 25, 26, 27, 28, 29 independently of one another, maintaining the pairs of plates 24, 25, 26, 27, 28, 29 in the respective operating positions respectively for a time set by the following formula:

$$t_{restart(i)} = t_{running} * p_{(i)}, \text{ where:}$$

$t_{restart(i)}$ (with i=1, . . . m)=maintenance time at the restart of the i-th pair of plates 24, 25, 26, 27, 28, 29 in the respective operating position;

$t_{running}$=time of maintenance at running speed of the pairs of plates 24, 25, 26, 27, 28, 29 in the respective operating positions;

$p_{(i)}$ (i=1, . . . m)=position of the i-th pair of plates 24, 25, 26, 27, 28, 29 in relation to the advancing direction F in the heating station 8, where i=1 indicates the position of the first pair of plates 24 further upstream with respect to the advancing direction F, and i=6 indicates the position of the sixth pair of plates 29 positioned further downstream with respect to the advancing direction F.

In other words, at the restart, the pairs of plates 24, 25, 26, 27, 28 and 29 will be maintained in the respective operating positions respectively for a time:

$t_{restart(1)} = t_{running} * 1$ for the first pair of plates 24;
$t_{restart(2)} = t_{running} * 2$ for the second pair of plates 25;
$t_{restart(3)} = t_{running} * 3$ for the third pair of plates 26;
$t_{restart(4)} = t_{running} * 4$ for the fourth pair of plates 27;
$t_{restart(5)} = t_{running} * 5$ for the fifth pair of plates 28;
$t_{restart(6)} = t_{running} * 6$ for the sixth pair of plates 29.

In particular, during this restart step, the sixth pair of plates 29 will be driven first and subsequently the pairs of plates 24, 25, 26, 27, 28 positioned further upstream than the sixth pair of plates 29 with a delay set by the following formula:

$$t_{driving(j)} (\text{with } j=1, \ldots m-1) = t_m + t_{running} * (p_{(m)} - p_{(m-j)}), \text{ where:}$$

thriving (j) (with j=1, . . . m−1)=time in which to restart the j-th pair of plates 24, 25, 26, 27, 28, positioned upstream of the pair of plates 29 positioned further downstream with respect to the advancing direction F, in the respective operating position;

$t_m$=time in which the pair of plates 24, 25, 26, 27, 28, 29 is driven that is positioned further downstream with respect to the advancing direction F;

$t_{running}$=time of maintenance at running speed of the pairs of plates 24, 25, 26, 27, 28, 29 in the respective operating positions;

P(m)=position of the m-th pair of plates 29 in the heating station 8 positioned further downstream with respect to the advancing direction F, for example $p_{(m)}=6$ for the sixth pair of plates 29;

$p_{(m-j)}$ (with j=1, . . . m−1)=position of the (m-j)-th pair of plates 24, 25, 26, 27, 28 in the heating station 8, for example $p_{(m-j)}=1$ for the fifth pair of plates 28.

For example, for theating=12 Seconds, $t_{running}=t_{heating}/n=12$ seconds/6=2 seconds, at the restart the pairs of plates 24, 25, 26, 27, 28, 29 will be respectively driven at the times:

$t_m$=for the sixth pair of plates 29;

$t_{restart(5)}=t_m+2$ seconds*(6-5)=$t_m+2$ seconds for the fifth pair of plates 28;

$t_{restart(4)}=t_m+2$ seconds*(6-4)=$t_m+4$ seconds for the fourth pair of plates 27;

$t_{restart(3)}=t_m+2$ seconds*(6-3)=$t_m+6$ seconds for the third pair of plates 26;

$t_{restart(2)}=t_m+2$ seconds*(6-2)=$t_m+8$ seconds for the second pair of plates 25;

$t_{restart(1)}=t_m+2$ seconds*(6-1)=$t_m+10$ seconds for the first pair of plates 24.

At the end of the restart, the controlling device again simultaneously drives the pairs of plates 24, 25, 26, 27, 28, 29 by maintaining each in the respective operating position for the $t_{running}$ time.

In this manner, by advancing the material in an indexed manner, all the set portions 23 are heated to a temperature that is such as to enable the set portions 23 to be softened and deformed plastically.

For example, for $t_{heating}=12$ Seconds, $t_{running}=t_{heating}/n=12$ seconds/6=2 seconds, and at the restart, there will be:

$t_{restart(1)}=2*1=2$ seconds for the first pair of plates 24;

$t_{restart(2)}=2*2=4$ seconds for the second pair of plates 25;

$t_{restart(3)}=2*3=6$ seconds for the third pair of plates 26;

$t_{restart(4)}=2*4=8$ seconds for the fourth pair of plates 27;

$t_{restart(5)}=2*5=10$ seconds for the fifth pair of plates 28;

$t_{restart(6)}=2*6=12$ seconds for the sixth pair of plates 29.

In this manner, at the restart of the apparatus 1 after a more or less protracted machine downtime, the portion 20 of the material 2 contained, at the moment of the machine downtime, in the heating station 8 is still reusable, inasmuch as each set portion 23 is heated, before leaving the heating station 8, to a temperature that is such as to enable the set portion 23 to be softened and subsequently deformed plastically.

In order to do so, the controlling device maintains the respective pairs of plates 24, 25, 26, 27, 28 and 29 in the respective operating positions in such a manner that the pairs of plates 25, 26, 27, 28 and 29 positioned gradually downstream of the first pair of plates 24 with respect to the advancing direction F remain in the respective operating position for intervals of time that increase as the distance increases that separates the pairs of plates 25, 26, 27, 28 and 29 from the first pair of plates 24.

In one embodiment of the invention, which is not shown, the pairs of plates are greater or lesser in number than six.

The material 2 that has been thus softened by the pair of plates 24, 25, 26, 27, 28 and 29 is passed through a forming station 30 in which the material 2 is deformed plastically to obtain the desired objects 32 by forming device 31.

Downstream of the forming station 30 a shearing station 50 can be provided that is not shown, where a suitable cutting device separates the objects 32 formed from the sheet of material 2 from which they have been obtained.

The invention claimed is:

1. A method for heating set portions of a sheet of thermoformable material following a machine downtime of a forming apparatus arranged for forming objects by forming said material, said method comprising the step of driving a plurality of heating devices of a heating station included in said forming apparatus between respective operating positions in which each of said heating devices contacts and heats one of said portions, respectively, and respective non-operating positions in which each of said heating devices is at a certain distance from said material, said heating devices being equally spaced in an advancing direction of said material in said heating station, wherein said driving step comprises independently driving each of said heating devices in such a manner that when said apparatus starts following said machine downtime, each of said heating devices is maintained in the respective operating position respectively for a time:

$$t_{restart(i)}=t_{running}*p_{(i)}, \text{ where:}$$

$t_{restart(i)(i=1,\ldots m)}$=time of maintenance at restart of the i-th heating device in the respective operating position;

$t_{running}=t_{heating}/n$, where: $t_{running}$=time for which said heating device in the respective operating position is maintained at running speed, $t_{heating}$=total heating time required for softening said portions and n=number of said heating devices;

$p_{(i) (with\ i=1\ \ldots\ m)}$=position of the i-th heating device with respect to the advancing direction of said material, where i=1 indicates the position of a first heating device positioned further upstream with respect to the advancing direction, and i=m indicates the position of a last heating device positioned furthest downstream with respect to said advancing direction; and driving each heating device positioned upstream of the last heating device positioned further downstream with respect to the advancing direction with a different delay, said delay being equal to $$t_{driving(j)(with\ j=1\ \ldots\ m-1)}=t_m+t_{running}*(p_{(m)}-p_{(m-j)}),$$
where:

$t_{driving(j)(with\ j=1\ \ldots\ m-1)}$=time in which to restart the j-th heating device positioned upstream of the heating device positioned further downstream with respect to said advancing direction in the respective operating position;

$t_m$=time in which the heating device is driven positioned further downstream with respect to the advancing direction;

$t_{running}$=time for which the pairs of plates in the respective operating positions are maintained at running speed;

$p_{(m)}$=position of the m-th heating device in said heating station positioned further downstream with respect to said advancing direction;

$p_{(m-j) (with\ j=1\ \ldots\ m-1)}$=position of the (m-j)-th heating device in said heating station.

2. A method according to claim 1, wherein after said independently driving step there is provided driving simultaneously said heating device, each being maintained in the respective operating position for said $t_{running}$.

* * * * *